United States Patent
Turner et al.

(10) Patent No.: US 7,651,055 B2
(45) Date of Patent: Jan. 26, 2010

(54) NON-STREAKING DRAINMAST

(75) Inventors: Jeffrey A. Turner, Chandler, AZ (US);
Andrew Appleby, Phoenix, AZ (US);
Robert L. Hoover, Phoenix, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 362 days.

(21) Appl. No.: 11/122,354

(22) Filed: May 5, 2005

(65) Prior Publication Data
US 2006/0249628 A1   Nov. 9, 2006

(51) Int. Cl.
*B64D 1/00* (2006.01)
(52) U.S. Cl. .................... 244/136; 244/129.1
(58) Field of Classification Search .......... 244/129.1, 244/136; 219/201; 60/39.084, 39.094; 392/478; 239/171, 125, 130, 103; 220/88.1; 169/45, 169/53; 114/185, 126, 135
See application file for complete search history.

(56) References Cited

U.S. PATENT DOCUMENTS

| | | | |
|---|---|---|---|
| 1,784,157 A | 12/1930 | Oglesby et al. | |
| 2,138,368 A * | 11/1938 | Briant | 114/185 |
| 2,408,774 A * | 10/1946 | Goddard et al. | 239/171 |
| 2,565,720 A * | 8/1951 | Collison et al. | 4/111.1 |
| 2,836,463 A * | 5/1958 | Wilson | 239/406 |
| 3,535,930 A * | 10/1970 | Rees | 73/861.68 |
| 3,556,444 A | 1/1971 | Kopp | |
| 4,075,967 A * | 2/1978 | Silvey | 114/243 |
| 4,078,605 A * | 3/1978 | Jones | 166/359 |
| 4,163,366 A | 8/1979 | Kent | |
| 4,275,603 A | 6/1981 | Kalocsay | |
| 5,104,069 A * | 4/1992 | Reising | 244/136 |
| 5,285,636 A | 2/1994 | Mayo et al. | |
| 5,552,576 A | 9/1996 | Giamati | |
| 5,655,732 A | 8/1997 | Frank | |
| 5,752,674 A * | 5/1998 | Mears et al. | 244/134 R |
| 5,790,619 A * | 8/1998 | Peck | 376/299 |
| 6,415,730 B1 * | 7/2002 | Barker | 114/243 |
| 6,425,554 B1 * | 7/2002 | Moreland | 244/136 |
| 6,435,452 B1 | 8/2002 | Jones | |
| 7,111,809 B1 * | 9/2006 | Tai et al. | 244/135 R |

* cited by examiner

*Primary Examiner*—Michael R Mansen
*Assistant Examiner*—Joshua J Michener
(74) *Attorney, Agent, or Firm*—Ingrassia Fisher & Lorenz, P.C.

(57) ABSTRACT

A drainmast for discharging fluid from a body in motion, such as an aircraft in flight, may include a barrier disposed at a distal portion of the drainmast. The barrier may extend downstream from the drainmast trailing edge, and may be disposed at a negative angle of attack to a local free-stream airflow, thereby forming a downdraft over the barrier to prevent migration of discharged fluid towards an aircraft skin. In some embodiments, the drainmast may include one or more vanes, disposed internally within a discharge conduit of the drainmast, for deflecting fluid flow within the drainmast towards a direction of free-stream airflow outside the drainmast. Methods for channeling fluid away from an external surface of an aircraft in flight are also disclosed.

36 Claims, 7 Drawing Sheets

NON-STREAKING DRAINMAST

BACKGROUND OF THE INVENTION

The present invention relates generally to methods and apparatus for discharging fluids from a body in motion, and in particular to the discharge of fluids from a vehicle.

It is known in the art to employ a drainmast to discharge unwanted or excess fluids from a moving vehicle, such as an aircraft in flight. Fluids discharged from aircraft using prior art drainmast apparatus include water-based liquids from the cabin, as well as engine-derived fluids, such as lubrication oil, hydraulic fluid and fuel. Oil droplets and air/oil mists that are expelled from the nacelle of a gas turbine engine often become attached to the outer surface of the nacelle or other portion of the aircraft skin, and may form an unsightly stain on the aircraft skin. Owners and operators of aircraft have expended substantial resources in attempting to prevent or remove such stains.

Prior art drainmasts having various configurations have been used on aircraft in an attempt to prevent discharged fluid from re-contacting the external surface (skin) of the aircraft. For example, prior art drainmasts of various designs have been employed to direct oil away from the engine nacelle, with only limited success. Such prior art apparatus and configurations include: a tubular structure aligned with the airflow and affixed to an outer portion of the mast, a drainmast having a rearward pointing fluid port, and a drainmast having a terminal cap with complex, curved geometry.

As an example, U.S. Pat. No. 6,425,554 to Moreland discloses a drainmast having a drain tube extending downwards to a curvaceous cap having both concave and convex geometry, and a recessed groove in the cap. However, the drainmast cap of the '554 patent exhibits relatively high drag, and has a complex geometry, which adds to the complexity and expense of drainmast manufacture.

As can be seen, there is a need for an improved drainmast for discharging fluid from a vehicle in motion, such as an aircraft in flight.

SUMMARY OF THE INVENTION

In one aspect of the present invention, an apparatus for discharging fluid from a body in motion comprises a drainmast having a leading edge and a trailing edge, the drainmast including a barrier extending from the trailing edge, and the barrier disposed at a negative angle of attack with respect to a local airflow.

In another aspect of the present invention, there is provided an apparatus for discharging fluid from a vehicle in motion, comprising a drainmast having a leading edge and a trailing edge; a discharge conduit disposed within the drainmast; and a barrier extending downstream from the trailing edge, wherein the drainmast includes a distal portion disposed within a free-stream airflow, the free-stream airflow is disposed beyond a boundary layer of the vehicle, the barrier is disposed at the distal portion of the drainmast, and the barrier is disposed at a negative angle of attack with respect to the free-stream airflow.

In yet another aspect of the present invention, an apparatus for discharging fluid from a body in motion comprises a drainmast; a discharge conduit disposed within the drainmast; and at least one vane disposed within the discharge conduit.

In still another aspect of the present invention, there is provided an apparatus for discharging fluid from an aircraft in flight, comprising a drainmast having a leading edge and a trailing edge; a discharge conduit disposed within the drainmast; and a barrier extending downstream from the trailing edge, wherein the drainmast includes a distal portion, the drainmast has a mast length, $L_{DM}$, such that the distal portion of the drainmast extends beyond a boundary layer of the aircraft and into a free-stream airflow, the drainmast terminates at the distal portion in a mast foot, wherein at least a portion of the mast foot is disposed at a cutback angle, $\alpha 3$, in the range of from about 2° to 15° with respect to a direction of the free-stream airflow. The discharge conduit is adapted for fluid flow therethrough, the discharge conduit terminates distally in a discharge port, the discharge port is adapted for discharge of the fluid from the aircraft, the discharge port is disposed at a forward portion of the mast foot, and the barrier is disposed at a negative angle of attack with respect to the free-stream airflow.

In a further aspect of the present invention, there is provided a system comprising a gas turbine engine housed within an aircraft skin, wherein the gas turbine engine comprises a source of fluid; and a drainmast in fluid communication with the gas turbine engine, wherein the drainmast includes a barrier extending from a trailing edge of the drainmast. The barrier is disposed within a free-stream airflow beyond a boundary layer of the aircraft skin, and the barrier is disposed at a negative angle of attack with respect to the free-stream airflow.

In yet a further aspect of the present invention, a method for channeling fluid away from an external surface of an aircraft in flight comprises passing fluid through a discharge conduit of a drainmast; forming a low pressure zone at a location distal to a mast foot, wherein the drainmast terminates distally in the mast foot; and discharging the fluid from the mast foot into the low pressure zone.

In still a further aspect of the present invention, a method is provided for channeling fluid away from an external surface of an aircraft in flight, the method comprising passing the fluid into a discharge conduit of a drainmast; deflecting the fluid flow within the discharge conduit via at least one vane, wherein the at least one vane is disposed within the discharge conduit; and discharging the fluid from the discharge conduit into a low pressure zone disposed distal to a mast foot, wherein the drainmast terminates distally in the mast foot, and the discharge conduit is adapted for fluid flow therethrough in a direction towards the mast foot.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for discharging fluids from a body, such as a vehicle, in motion. In one embodiment, the present invention provides a drainmast for discharging fluid from an aircraft in flight, wherein the drainmast discharges the fluid away from the aircraft outer surface or skin, and prevents further contact between the discharged fluid and the aircraft. As an example, the present invention may be used to discharge oil, or an air/oil mixture, from an engine nacelle or tail cone of fixed-wing commercial aircraft. The present invention may also be used for fluid discharge from other vehicles, including rotorcraft, and various ground vehicles, and the like.

Drainmasts of the invention may include a barrier, at a distal portion of the drainmast, extending downstream from the drainmast trailing edge and disposed at a negative angle of attack to the local airflow, such as a free-stream airflow outside the boundary layer of a body in motion, e.g., an aircraft in flight, to discharge fluid away from the drainmast and the aircraft. In contrast, prior art drainmasts have used a barrier disposed at either a positive angle of attack to the local airflow or parallel to the local airflow. Other prior art drainmasts, which may completely lack a barrier, have used various configurations in an attempt to prevent discharged fluid from re-contacting the drainmast and aircraft, including: a rearward pointing fluid discharge port, a drainmast cap having both concave and convex geometry, and a tubular structure aligned with the airflow and affixed to an outer portion of the mast. In other embodiments, drainmasts of the present invention may be distinguished from the prior art by the presence of one or more vanes disposed internally within a discharge conduit of the drainmast, wherein the vane(s) may, inter alia, strengthen the drainmast, and deflect fluid flow within the mast towards the direction of free-stream airflow outside the drainmast. Drainmasts of the prior art may lack internally disposed vanes.

Figure 1:
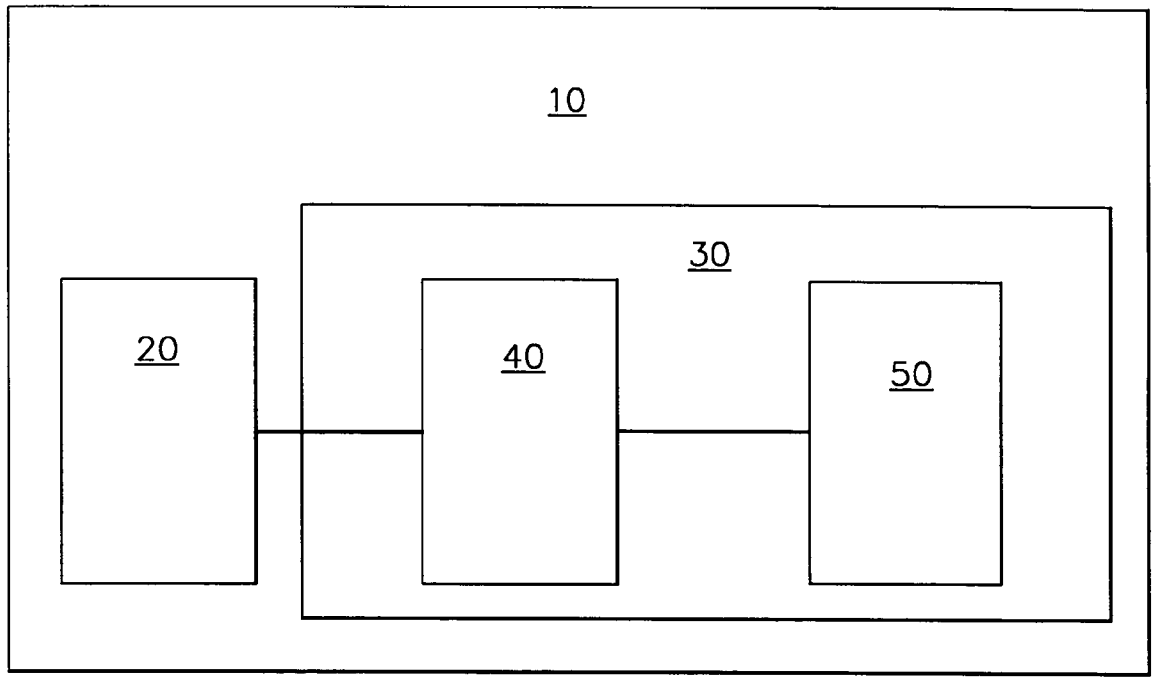
FIG. 1 is a block diagram schematically representing a fluid source of a body in relation to a fluid discharge apparatus comprising a drainmast, according to the instant invention.

FIG. 1 is a block diagram schematically representing a body 10 which may include a fluid source 20 and a fluid discharge apparatus 30 in communication with fluid source 20, according to an embodiment of the instant invention.

Fluid discharge apparatus 30 may include a fluid collection unit 40 and a drainmast 50 in fluid communication with fluid collection unit 40. Fluid collection unit 40 may be in fluid communication with fluid source 20.

Again with reference to FIG. 1, body 10 may comprise a vehicle, or the like. For example, body 10 may be a body in motion. In some embodiments, body 10 may be an aircraft in flight. Fluid source 20 may be, for example, an engine such as a gas turbine engine. Fluid source 20 may be a source of one or more fluids, which may emanate from various portions or components of fluid source 20. Fluid source 20 may be a source of fuel or a source of oil, such as lubricating oil for engine components, for example, bearings and a gearbox (both well known in the art and not shown in the drawings). Fluid source 20 may further be a source of air, e.g., leakage air from a gas turbine engine. Fluid emanating from fluid source 20 may include fuel for a gas turbine engine, or may be a mixture of oil and air, for example, in the form of an air/oil mist, which may include particles or droplets of oil dispersed in air.

Again with reference to FIG. 1, fluid collection unit 40 may be in communication with the one or more sources of fluid from fluid source 20. For example, fluid collection unit 40 may be in communication with one or more bearing sumps and one or more gearboxes of one or more gas turbine engines. Fluid collection unit 40 may comprise a drainage device and/or a reservoir (not shown), which may be in fluid communication with drainmast 50. A proximal portion of drainmast 50 may be housed within the external surface of body 10, while a distal portion of drainmast 50 may extend distally from the external surface of body 10 (see, for example, FIG. 3A). Drainmast 50 may be adapted for discharging fluid from body 10 while body 10 is in motion, such that the discharged fluid may be channeled away from body 10, and such that the discharged fluid does not re-contact the external surface of body 10.

Figure 2A:
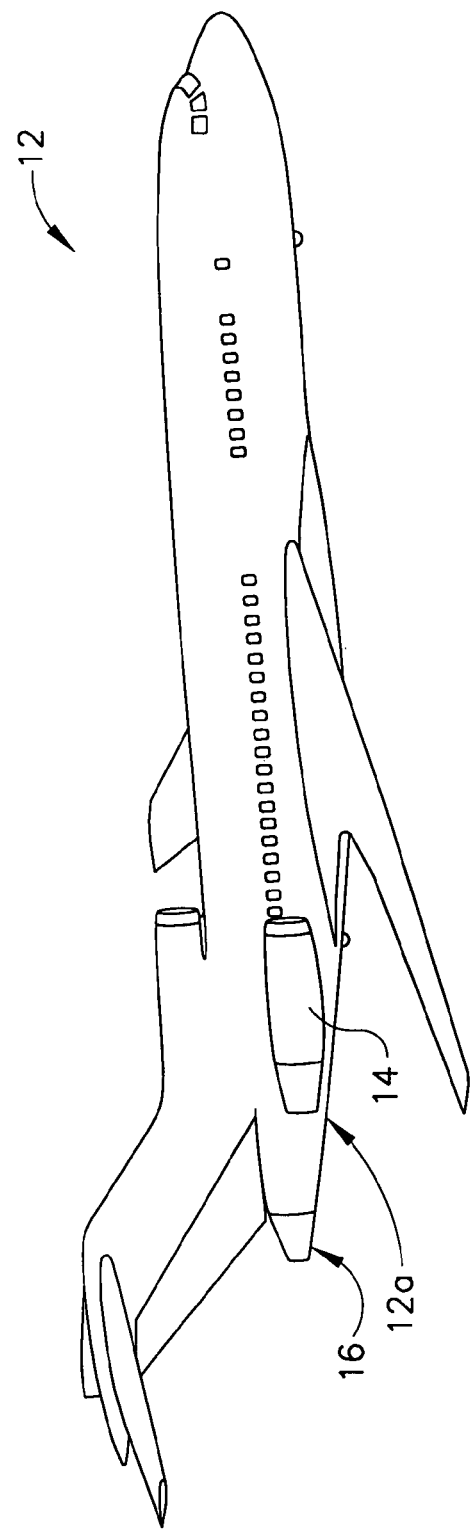
FIG. 2A is a perspective view schematically representing an aircraft housing a source of fluid, according to one embodiment of the invention.
Figure 2B:
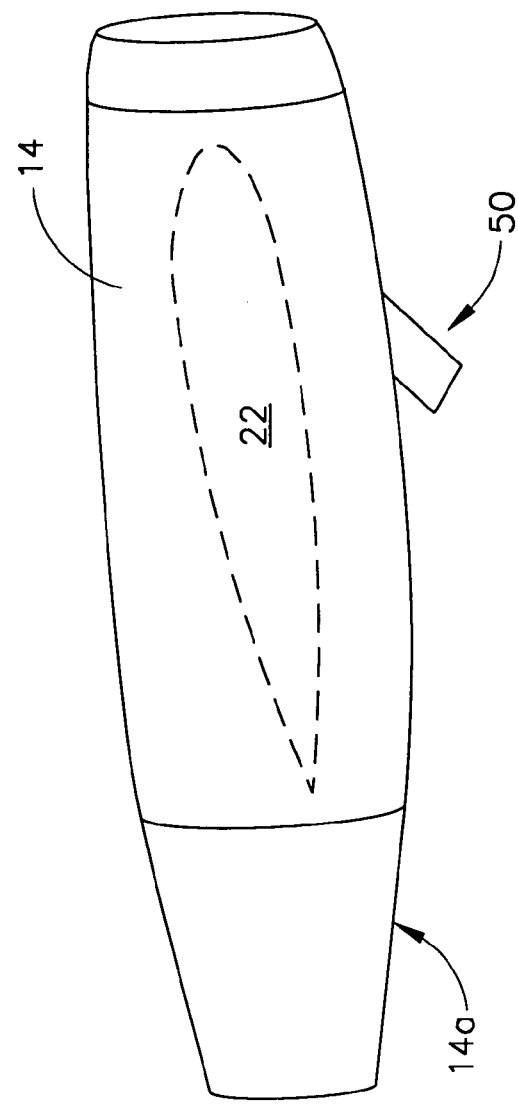
FIG. 2B is a side view of an engine nacelle for an aircraft, showing a drainmast extending from the engine nacelle, according to an embodiment of the invention.

FIG. 2A is a perspective view schematically representing an aircraft 12, which may have at least one drainmast 50 (see, for example, FIG. 2B) extending therefrom, according to an embodiment of the present invention. Aircraft 12 may include at least one engine nacelle 14 for housing a gas turbine engine 22, such as a main engine or propulsion engine. Aircraft 12 may further include a tail cone 16 for housing an auxiliary power unit (not shown), which may be a gas turbine engine for auxiliary power generation, as is well known in the art. Aircraft 12 may have an aircraft skin or external surface 12a. Drainmast 50 may extend from external surface 12a, e.g., at tail cone 16 or engine nacelle 14 (FIG. 2B). Although a fixed wing aircraft is shown in FIG. 2A, the invention is not limited to such vehicles, but rather may also be applicable to rotorcraft, as well as land vehicles, and vehicles adapted for motion through media other than air.

FIG. 2B is a side view of engine nacelle 14 having a gas turbine engine 22 (shown in broken lines) housed within engine nacelle 14, and a drainmast 50 extending from engine nacelle 14. Gas turbine engine 22 may be a source of one or more fluids, such as fuel, oil and air, and drainmast 50 may be in fluid communication with gas turbine engine 22 for discharging the fluid(s) from aircraft 12 via drainmast 50, such that the discharged fluid does not contact aircraft external surface 12a. As an example, aircraft external surface 12a may include a skin or outer surface 14a of engine nacelle 14. Fluid source 20 and fluid collection unit 40 may be housed within external surface 12a of aircraft 12, e.g., within engine nacelle 14.

Figure 3A:
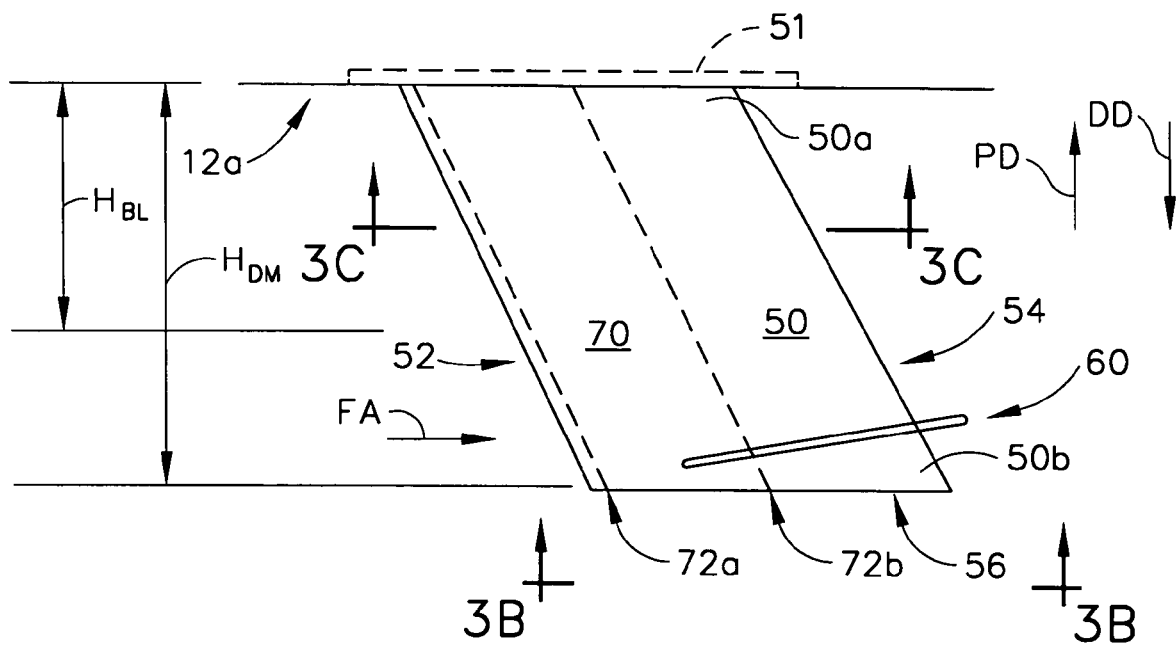
FIG. 3A is a side view of a drainmast having a barrier disposed at a negative angle of attack, according to one aspect of the invention.

FIG. 3A is a side view of a drainmast 50, according to one aspect of the invention. Drainmast 50 may be affixed to external surface 12a via a mounting unit 51. External surface 12a may comprise the outer surface or skin of a body 10, which may be in motion, or adapted for motion, through a medium such as air. For example, external surface 12a may comprise the skin of an aircraft 12 or other vehicle. Drainmast 50 may be affixed to external surface 12a either internally (as shown), or externally. Drainmast 50 may have a proximal portion 50a and a distal portion 50b. Proximal portion 50a of drainmast 50 may be adjacent to external surface 12a. Distal portion 50a of drainmast 50 may terminate distally in a mast foot 56 (see, for example, FIG. 3B). A proximal direction, PD, and a distal direction, DD, are shown in FIG. 3A by the arrows labeled accordingly. Drainmast 50 may include a mast leading edge 52 and a mast trailing edge 54.

Again with reference to FIG. 3A, drainmast 50 may have a barrier 60 disposed at distal portion 50b. Drainmast 50 may extend distally from external surface 12a by a mast height, $H_{DM}$, such that distal portion 50b of drainmast 50 may be disposed distal to a boundary layer, BL, which may extend from external surface 12a by a boundary layer height, $H_{BL}$. The mast height, $H_{DM}$, of drainmast 50 may be equal to, or greater than, boundary layer height, $H_{BL}$, such that distal portion 50b of drainmast 50 may extend beyond boundary layer, BL into a free-stream airflow, FA. Accordingly, during flight, a local airflow over barrier 60 may be free-stream airflow, FA. Barrier 60 may be disposed at a negative angle of attack with respect to the direction of free-stream airflow, FA (see, for example, FIG. 4A). Typically, the free-stream airflow, FA, may be at least substantially parallel to external surface 12a at a point of attachment of drainmast 50 to body 10 or aircraft 12.

With further reference to FIG. 3A, a discharge conduit 70, which may be adapted for fluid flow therethrough, may be disposed within drainmast 50. Discharge conduit 70 may be in fluid communication with fluid collection unit 40 and fluid source 20 (FIG. 1). Discharge conduit 70 may be integral with drainmast 50, or in alternative embodiments, discharge conduit 70 may comprise a separate component. Discharge conduit 70 may terminate distally in a discharge port 72 (see, for example, FIG. 3B) for discharging fluid from drainmast 50.

Figure 3B:
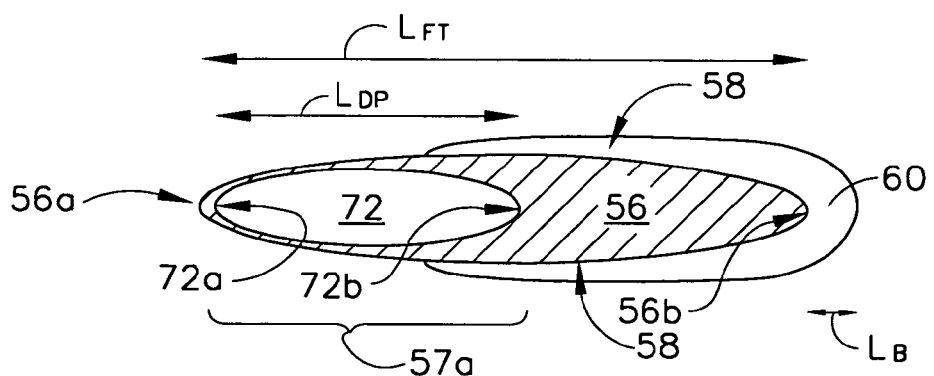
FIG. 3B is an end view showing the mast foot of the drainmast of FIG. 3A as seen along the line 3B-3B of FIG. 3A.

FIG. 3B is an end view showing mast foot 56 of drainmast 50 in relation to barrier 60, as seen along the line 3B-3B of FIG. 3A. At least a portion of mast foot 56 may be planar. Mast foot 56 may have a foot leading edge 56a and a foot trailing edge 56b. Mast foot 56 may further have a forward portion 57a, which may be disposed adjacent to foot leading edge 56a, and an aft portion 57b.

At least a portion of mast foot 56, for example, forward portion 57a, may be disposed at a cutback angle, α3, to a direction of free-stream airflow (see, for example, FIGS. 4C-D). Forward portion 57a of mast foot 56 may define a low pressure zone, $Z_{LP}$, disposed distal to forward portion 57a (see, for example, FIG. 5A). As an example, during flight of aircraft 12, the low pressure zone, $Z_{LP}$, may result from free-stream airflow, FA, over mast foot 56 disposed at cutback angle, α3 (see, for example, FIG. 5A). Discharge port 72 may be disposed at forward portion 57a of mast foot 56. Accordingly, discharge port 72 may be disposed adjacent to the low pressure zone, $Z_{LP}$, disposed distal to forward portion 57a of mast foot 56. While not being bound by theory, the low pressure zone, $Z_{LP}$, disposed adjacent to discharge port 72 may serve to draw fluid through discharge conduit 70, and the low pressure zone, $Z_{LP}$, may promote discharge of fluid from drainmast 50.

Discharge port 72 may have an upstream perimeter 72a and a downstream perimeter 72b. Discharge port 72 may have a discharge port length, $L_{DP}$, extending in a downstream direction from upstream perimeter 72a to downstream perimeter 72b. Upstream perimeter 72a may be disposed adjacent to leading edge 56a of mast foot 56. Downstream perimeter 72b may be located at a distance from leading edge 56a of not more than about 70% of a mast foot length, $L_{FT}$, of mast foot 56, typically not more than about 60% of mast foot length, $L_{FT}$, and usually not more than about 50% of mast foot length, $L_{FT}$. Discharge port length, $L_{DP}$ may typically be not more than about 70% of mast foot length, $L_{FT}$, usually not more than about 60% of mast foot length, $L_{FT}$, and often not more than about 50% of mast foot length, $L_{FT}$. Discharge port 72 may have an oval or elliptical shape as shown, or in alternative embodiments (not shown), discharge port 72 may have a radiused edge at downstream perimeter 72b.

Again with reference to FIG. 3B, barrier 60 may extend from trailing edge 54. For example, barrier 60 may extend in a downstream direction from trailing edge 54 by a barrier length, $L_B$. In some embodiments, barrier length, $L_B$, may be as little as about 4 mm, or less. In other embodiments, barrier length, $L_B$, may be considerably greater than about 4 mm (about 0.150 inch). Barrier 60 may be disposed at least partially along mast sides 58 of drainmast 50. In some embodiments, barrier 60 may at least partially surround distal portion 50b of drainmast 50.

Figure 3C:
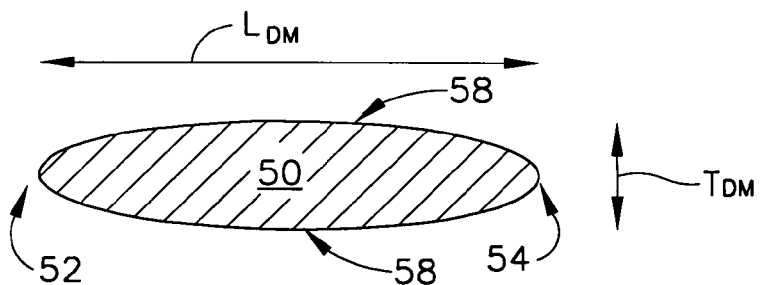
FIG. 3C is a transverse sectional view of the drainmast of FIG. 3A, as seen along the line 3C-3C of FIG. 3A.

FIG. 3C is a transverse sectional view of drainmast 50 as seen along the line 3C-3C of FIG. 3A. Drainmast 50 may have an airfoil, or airfoil-like, configuration. Drainmast 50 may have a maximum thickness, $T_{DM}$, and a chord, or mast length, $L_{DM}$. Drainmast 50 may have a thickness to chord ratio, $T_{DM}$:$L_{DM}$, typically in the range of from about 10 to 20%, usually from about 13 to 17%, and often about 14 to 16%. Discharge conduit 70 is omitted from FIG. 3C for the sake of clarity.

At least one of barrier 60 and discharge conduit 70 may be integral with drainmast 50. Drainmast 50 may be formed from metal, such as an aluminum alloy, or from a composite material, or various synthetic polymers, and the like. Drainmast 50 may be formed as a single component, for example, by a casting process, or by machining a single billet of aluminum or other material. In alternative embodiments, drainmast 50 may be assembled from separate components, such as a separate discharge conduit 70 retained within and between mast sides 58. As an example, in some embodiments of the present invention, drainmast 50 may be assembled from sheet metal.

Figure 4A:
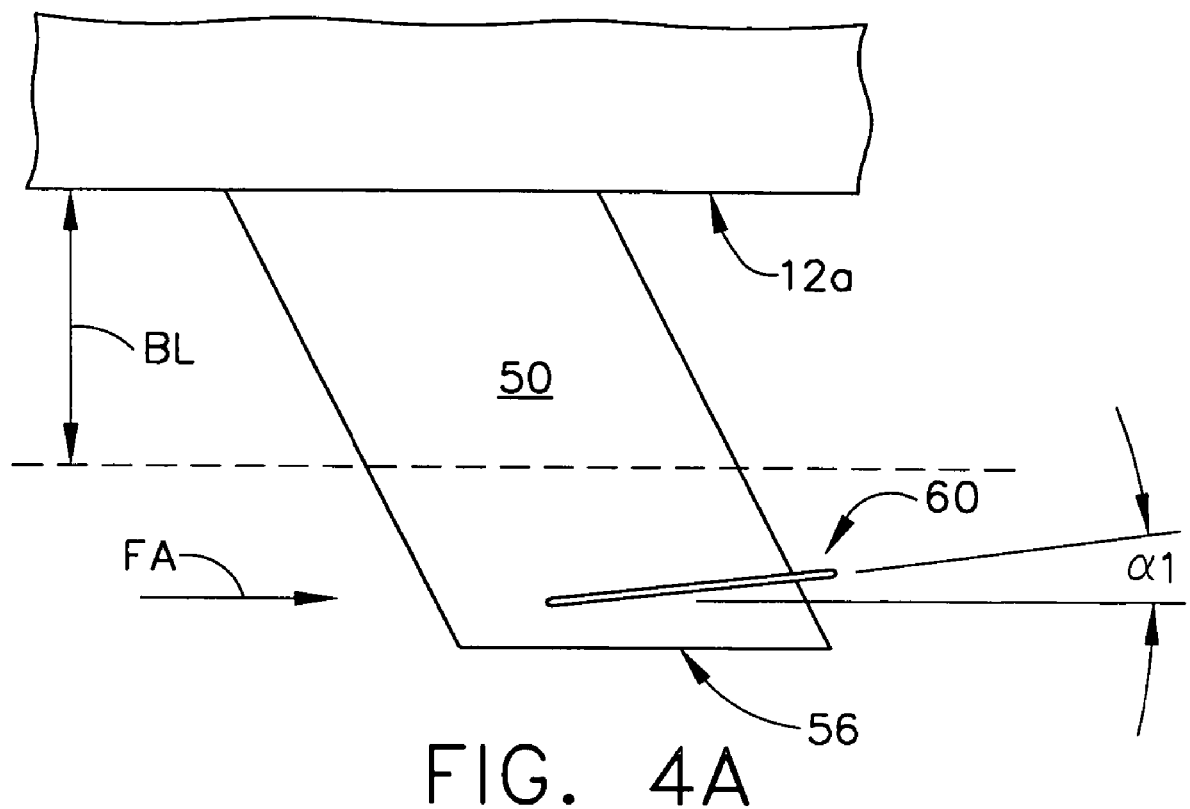
FIG. 4A is a side view of a drainmast indicating a barrier angle and, according to one aspect of the invention.

FIG. 4A is a side view of a drainmast 50 in relation to an external surface 12a to which drainmast 50 may be attached. External surface 12a may be an external surface of a body 10, or the skin of an aircraft 12 or other vehicle. Drainmast 50 may have barrier 60 disposed at distal portion 50b of drainmast 50 at a location distal to boundary layer, BL, such that barrier 60 may be disposed within a free-stream airflow, FA. The direction of the free-stream airflow, FA, may be indicated in FIG. 4A by the arrow. Barrier 60 may be disposed at a barrier angle, α1, to the direction of free-stream airflow, FA, such that barrier 60 has a negative angle of attack with respect to free-stream airflow, FA. Barrier angle, α1, may typically be in the range of from about 2 to 15°, usually from about 3 to 12°, and often from about 5-10°.

Figure 4B:
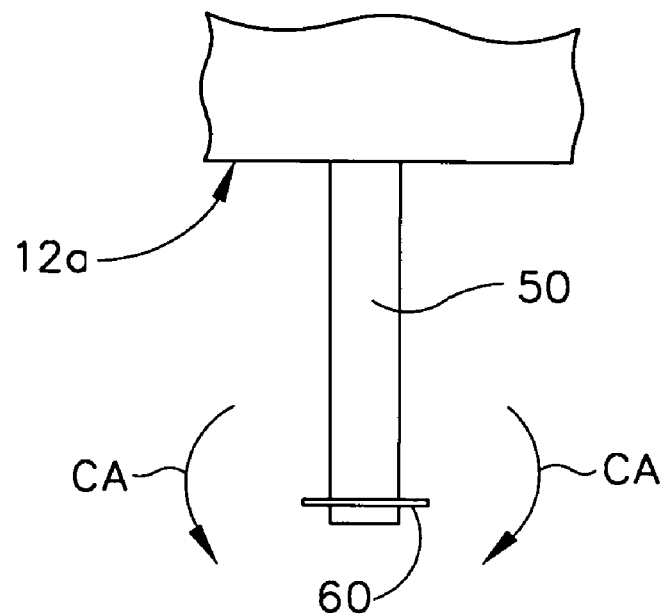
FIG. 4B is an end view of the trailing edge of a drainmast showing a downdraft over a barrier, as seen along the line 4B-4B of FIG. 4A.

FIG. 4B is a view of the trailing edge 54 of drainmast 50, as seen along the lines 4B-4B of FIG. 4A, showing the general direction of a downdraft over barrier 60 as indicated by the curved arrows labeled, CA. The downdraft over barrier 60 may result from the flow of free-stream airflow, FA, over barrier 60. The negative angle of attack of barrier 60, and the resultant downdraft over barrier 60 may prevent fluid, which has been discharged from drainmast 50, from re-contacting external surface 12a, e.g., by preventing proximal migration of the discharged fluid on an outer surface of drainmast 50.

Figure 5A:
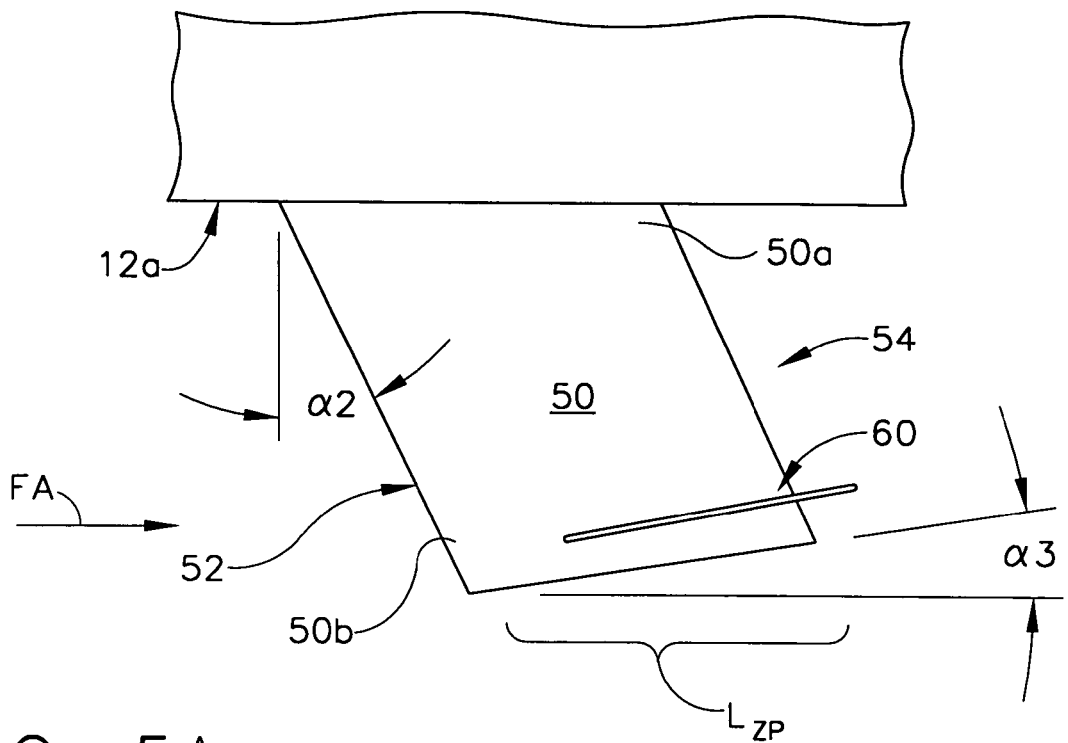
FIG. 5A is a side view of a drainmast indicating a cutback angle of the mast foot and a swept back angle of the leading edge, according to another aspect of the invention.

FIG. 5A is a side view of a drainmast 50, according to another aspect of the invention. Leading edge 52 of drainmast 50 may be swept backwards, for example, at a swept back angle, $\alpha 2$, to a line or direction orthogonal to external surface 12a at the location of attachment of drainmast 50 to aircraft 12 or body 10. Swept back angle, $\alpha 2$, may typically be in the range of from about 0 to 35°, usually from about 2 to 20°, and often from about 5-15°. Swept back angle, $\alpha 2$, may decrease drag of drainmast 50, e.g., during aircraft flight.

Once again with reference to FIG. 5A, drainmast 50 may terminate distally at mast foot 56 (see, for example, FIG. 3B). The direction of free-stream airflow, FA, may be indicated in FIG. 5A by the arrow. Mast foot 56 may be disposed at a cutback angle, $\alpha 3$, with respect to the direction of free-stream airflow, FA. Cutback angle, $\alpha 3$, may typically be in the range of from about 0 to 20°, usually from about 2 to 18°, and often from about 3-15°. Cutback angle, $\alpha 3$, may generate a low pressure zone, $Z_{LP}$, adjacent to forward portion 57a of mast foot 56, due to free-stream airflow, FA, at mast foot 56.

Figure 5B:
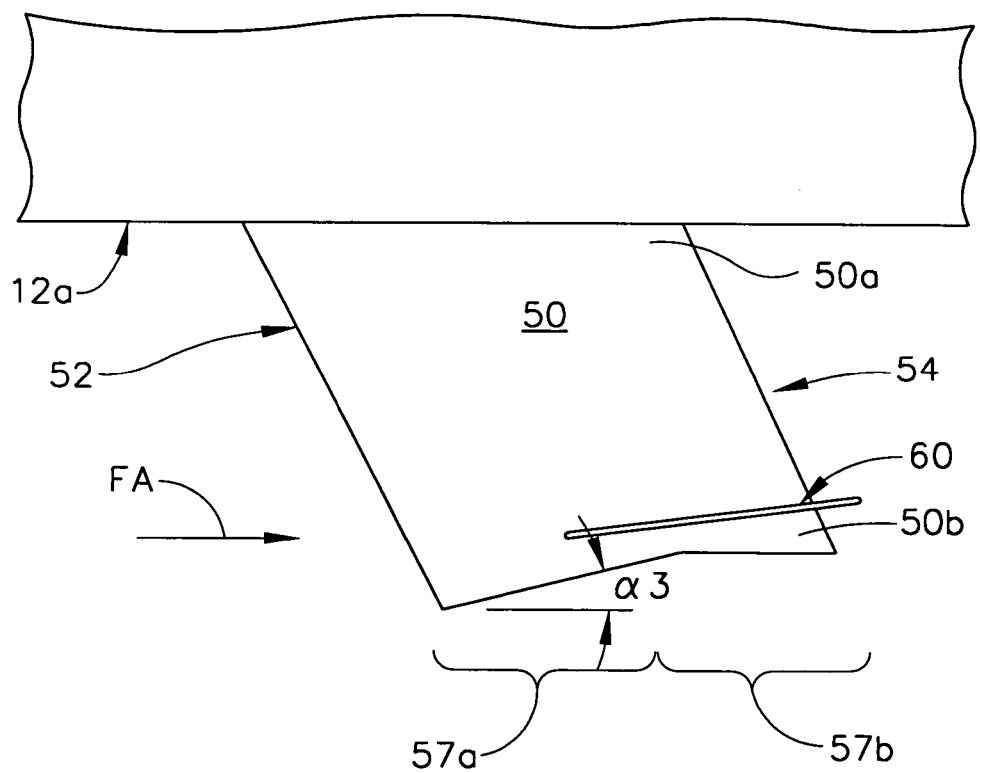
FIG. 5B is a side view of a drainmast indicating a cutback angle of a forward portion of the mast foot, according to another aspect of the invention.

FIG. 5B is a side view of a drainmast 50, according to another aspect of the invention. Drainmast 50 may terminate distally in mast foot 56, wherein mast foot 56 may include forward portion 57a and aft portion 57b. Forward portion 57a may be disposed at cutback angle, $\alpha 3$, with respect to the direction of the free-stream airflow, FA, substantially as described with reference to FIG. 5A, while aft portion 57b may be angled with respect to forward portion 57a.

Figure 6A:
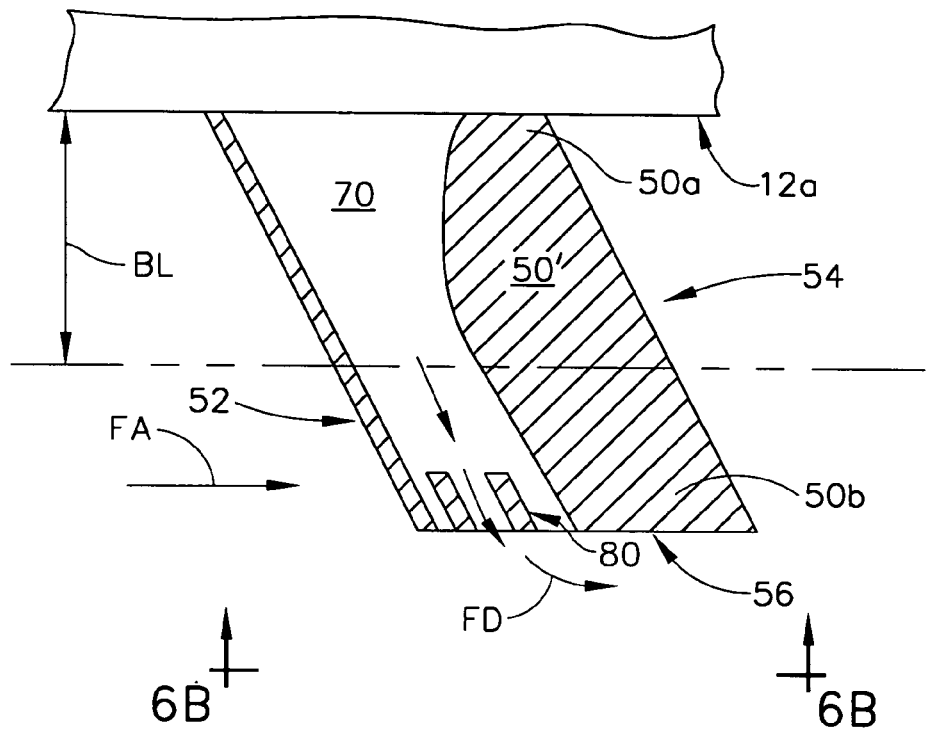
FIG. 6A is a side view of a drainmast having at least one vane disposed within a discharge conduit of the drainmast, according to another embodiment of the invention.

FIG. 6A is a side view of a drainmast 50' having proximal portion 50a and distal portion 50b, according to another embodiment of the invention. Proximal portion 50a may be disposed adjacent to an external surface 12a. External surface 12a may be a skin or exterior of a body 10 in motion, and distal portion 50b may extend distally beyond boundary layer BL and into a free-stream airflow, FA, the direction of which is indicated by the arrow labeled FA.

Figure 6B:
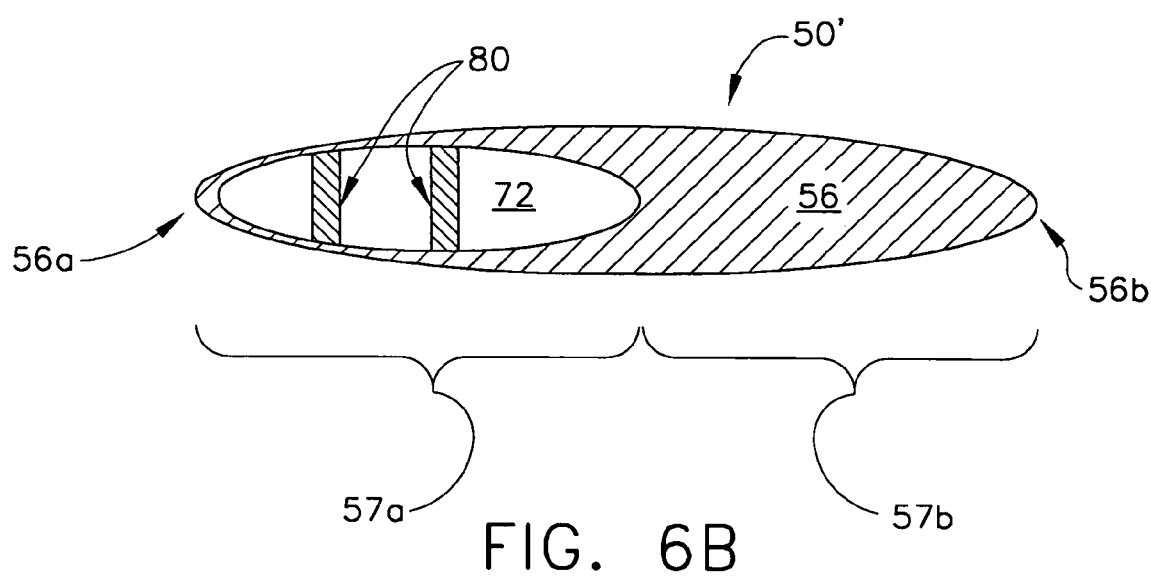
FIG. 6B is an end view of the mast foot of the drainmast of FIG. 6A, as seen along the line 6B-6B of FIG. 6A.

FIG. 6B is an end view of the drainmast 50' of FIG. 5A as seen along the line 6B-6B of FIG. 6A. With reference to FIGS. 6A-B, drainmast 50' may terminate distally in mast foot 56, having foot leading edge 56a and foot trailing edge 56b. Discharge conduit 70 may terminate distally in discharge port 72, wherein discharge port 72 may be disposed adjacent to forward portion 57a of mast foot 56. Drainmast 50' may include at least one vane 80 disposed within discharge conduit 70. Vane(s) 80 may be disposed within discharge conduit 70 adjacent to discharge port 72. Vane(s) 80 may be adapted to deflect fluid flow within discharge conduit 70 towards the direction of free-stream airflow, FA. The fluid discharge direction, FD, of the fluid discharged from discharge port 72 may be indicated in FIG. 6A by the stream of solid arrows.

While not being bound by theory, vanes 80 may facilitate drawing fluid flow from discharge conduit 70 by deflecting the fluid discharge direction, FD, to better align with the direction of free-stream airflow, FA, outside discharge conduit 70. Such alignment of fluid flow may reduce the turning losses that may otherwise occur if the fluid discharge direction, FD was more normal to the direction of free-stream airflow, FA. The number and configuration of vanes 80 disposed within discharge conduit 70 may be, at least to some extent, a matter of design choice.

In some embodiments, drainmast 50' may include a barrier 60 substantially as described hereinabove, for example, with reference to FIGS. 3A-B. In alternative embodiments, drainmast 50' may lack a barrier.

Figure 7:
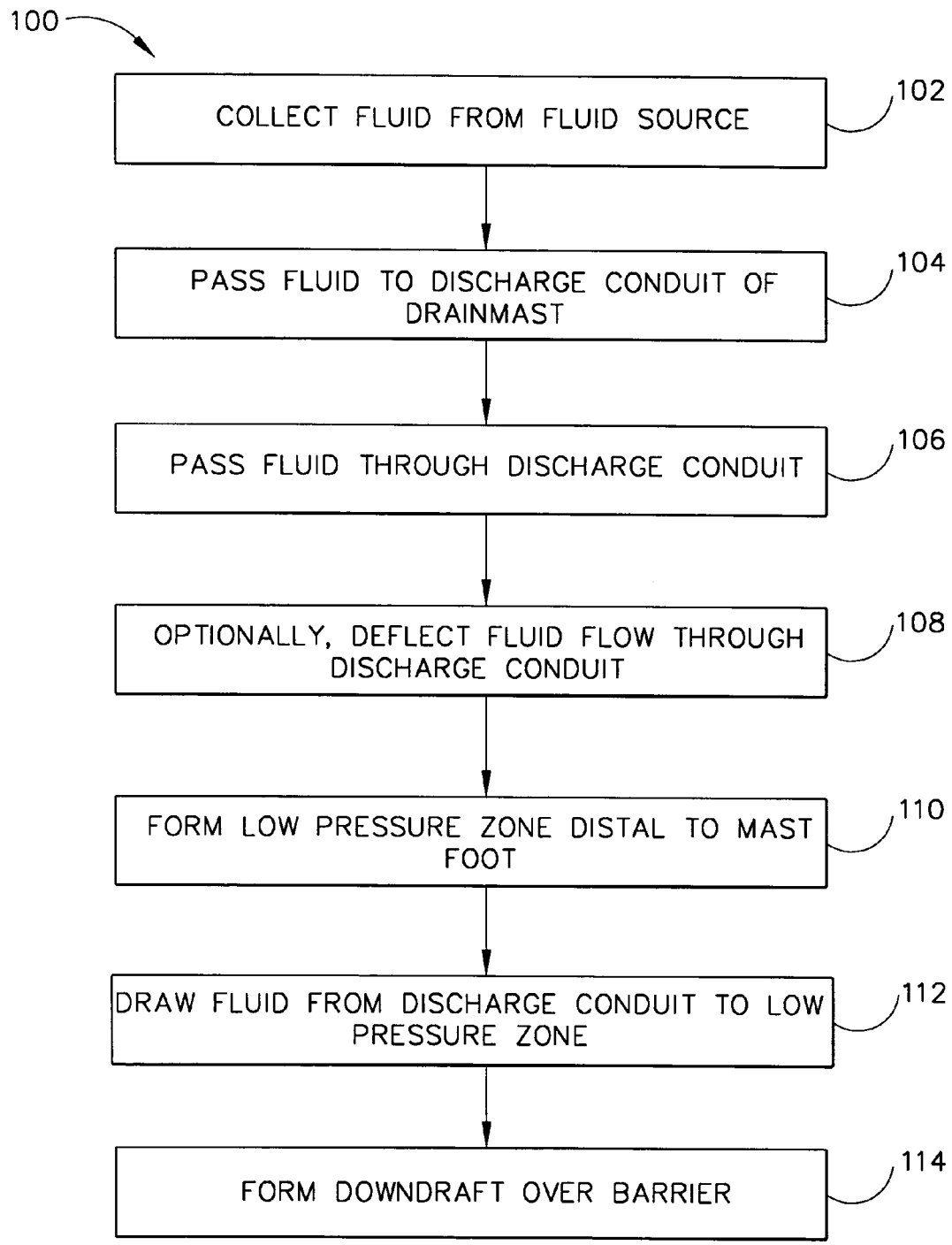
FIG. 7 schematically represents a series of steps involved in a method for channeling a fluid away from an aircraft in flight, according to another embodiment of the invention.

FIG. 7 schematically represents a series of steps involved in a method 100 for discharging a fluid from a drainmast of an aircraft in flight, and for channeling the fluid away from the aircraft, according to another embodiment of the invention, wherein step 102 may involve collecting one or more fluids from a fluid source. The fluid(s) may be collected in a fluid collection unit in fluid communication with the source of fluid. The fluid source may comprise an engine, such as a gas turbine engine. The fluid collection unit may be in fluid communication with one or more bearing sumps and one or more gearboxes of the gas turbine engine(s).

Step 104 may involve passing the fluid to a discharge conduit of the drainmast from the fluid collection unit. The fluid passed to the discharge conduit from the fluid source may comprise, e.g., a fuel, a lubricating oil, or an air/oil mixture, emanating from the gas turbine engine.

The drainmast may have a proximal portion affixed to an external surface of the aircraft or other body in motion. The drainmast may have a distal portion disposed within a free-stream airflow, e.g., beyond a boundary layer of the external surface of the body in motion. The drainmast may have a barrier disposed at the mast distal portion, and the barrier may be disposed within the free-stream airflow. The barrier may have a negative angle of attack with respect to the direction of the free-stream airflow. The drainmast and discharge conduit may each have other features, elements, and characteristics as described hereinabove, e.g., with reference to FIGS. 1-6B for drainmast 50/50'.

Step 106 may involve passing the fluid through the discharge conduit. The fluid may be passed through the discharge conduit in a distal direction towards a terminal discharge port which may be adapted for. discharging the fluid from the drainmast.

Optional step 108 may involve deflecting the fluid flow as the fluid passes through the discharge conduit. The fluid flow may be deflected as the fluid passes through the discharge conduit by one or more vanes, wherein the one or more vanes may be disposed within the discharge conduit. The one or more vanes may be disposed adjacent to the discharge port. The one or more vanes may deflect the fluid flow within the discharge conduit towards the direction of a free-stream airflow, for example, as described hereinabove with reference to FIGS. 6A-B.

Step 110 may involve forming a low pressure zone adjacent to the mast foot. The low pressure zone may be at least partially responsible for passing the fluid through the discharge conduit (step 108). The low pressure zone may be disposed distal to a forward portion of the mast foot. The low pressure zone may be generated by a cutback angle of the mast foot, as described hereinabove, for example, with reference to FIG. 3B.

Step 112 may involve drawing the fluid from the discharge conduit via the discharge port. The fluid may be drawn from the discharge port by the low pressure zone located adjacent to the forward portion of the mast foot. In some embodiments, discharge of the fluid from the discharge port may be facilitated by deflecting the fluid flow via one or more internal vanes as the fluid passes through the discharge conduit, according to step 108.

Step 114 may involve forming a downdraft over the barrier disposed on, and extending from, the drainmast. The downdraft may be formed as a result of the free-stream airflow flowing over the barrier disposed at the negative angle of attack of the barrier with respect to the direction of the free-stream airflow. The downdraft may prevent discharged fluid, e.g., oil droplets, form contacting an external surface of the aircraft in flight, or other body in motion, to which the drainmast may be affixed. For example, the downdraft may prevent fluid, such as an oil film, from migrating proximally over an external surface of the drainmast.

Although the invention has been described primarily with respect to discharge of oil-containing fluid from aircraft, the present invention may also find applications for the discharge of other fluids, including water-based liquids, from aircraft. Furthermore, although the invention has been described primarily with respect to fluid discharge from vehicles in motion through air, e.g., aircraft in flight, the present invention may also find applications for fluid discharge from other bodies in motion, either through air or through media other than air.

It should be understood, of course, that the foregoing relates to exemplary embodiments of the invention and that modifications may be made without departing from the spirit and scope of the invention as set forth in the following claims.

We claim:

1. An apparatus for discharging fluid from an aircraft in motion with a nose portion and a tail portion, comprising:
   a drainmast having a leading edge and a trailing edge;
   a barrier extending from said trailing edge of said drainmast; and
   said barrier disposed at a negative angle of attack with respect to a local airflow that flows in a direction from the nose portion to the tail portion.

2. The apparatus of claim 1, wherein said local airflow comprises a free-stream airflow.

3. The apparatus of claim 1, wherein said barrier and said local airflow are located distal to a boundary layer of said aircraft.

4. The apparatus of claim 1, wherein said fluid comprises one or more fluids selected from the group consisting of oil, fuel, and air.

5. The apparatus of claim 2, wherein:
   said barrier is disposed at a barrier angle, $\alpha 1$, with respect to a direction of said free-stream airflow, and
   said barrier angle, $\alpha 1$, is in the range of from about 2 to 15°.

6. The apparatus of claim 1, wherein:
   said drainmast includes a proximal portion affixed to said aircraft and a distal portion extending distally from said aircraft,
   said barrier is disposed at said distal portion of said drainmast, and
   said barrier is disposed distal to a boundary layer of said aircraft.

7. The apparatus of claim 6, wherein:
   said distal portion of said drainmast terminates in a mast foot, and
   said barrier is disposed proximal to said mast foot.

8. The apparatus of claim 1, wherein said leading edge is swept backwards from a direction orthogonal to an external surface of said aircraft at a location of attachment of said drainmast to said aircraft.

9. The apparatus of claim 2, wherein:
   said drainmast terminates distally in a mast foot,
   at least a forward portion of said mast foot defines a cutback angle, $\alpha 3$, with respect to a direction of said free-stream airflow, and
   said cutback angle, $\alpha 3$, is from about 2 to 18°.

10. The apparatus of claim 1, wherein said drainmast has a thickness to chord ratio, $T_{DM}:L_{DM}$, of from about 13 to 17%.

11. The apparatus of claim 1, wherein said drainmast has a mast height, $H_{DM}$, equal to or greater than a boundary layer height, $H_{BL}$, of a boundary layer of said aircraft.

12. The apparatus of claim 1, further comprising:
   a discharge conduit disposed within said drainmast at a distance from the barrier,
   said discharge conduit extending from a proximal portion of said drainmast to a mast foot, and
   wherein said discharge conduit terminates distally in a discharge port.

13. The apparatus of claim 12, wherein:
   said discharge port is disposed at a forward portion of said mast foot, and
   said discharge port has an upstream perimeter disposed adjacent to said leading edge of said mast foot.

14. The apparatus of claim 13, wherein:
   said discharge port has a downstream perimeter, and
   said downstream perimeter is located at a distance from a leading edge of said mast foot of not more than 70% of a mast foot length, $L_{FT}$, of said mast foot.

15. The apparatus of claim 1, wherein said barrier is integral with said drainmast.

16. The apparatus of claim 1, wherein said barrier at least partially surrounds a distal portion of said drainmast.

17. The apparatus of claim 1, further comprising:
   a discharge conduit disposed within said drainmast, said discharge conduit adapted for fluid flow therethrough; and
   at least one vane disposed within said discharge conduit, said at least one vane adapted for deflecting said fluid flow within said discharge conduit.

18. The apparatus of claim 1, further comprising:
   a discharge conduit disposed within said drainmast; and at least one vane disposed within said discharge conduit,
   wherein said at least one vane is adapted for strengthening said drainmast.

19. The apparatus of claim 1, wherein:
   said drainmast includes a discharge conduit, and
   said discharge conduit is integral with said drainmast.

20. The apparatus of claim 19, wherein said drainmast is formed as a single component by a casting process or by machining a single billet.

21. The apparatus of claim 1, wherein: said drainmast terminates distally in a mast foot and at a distance from the barrier, and at least a portion of said mast foot is planar.

22. An aircraft, comprising:
   a body having a nose portion and a tail portion; and
   an apparatus coupled to the body and configured to discharge fluid from the body while in motion, the apparatus comprising:
   a drainmast having a leading edge and a trailing edge;
   a discharge conduit disposed within said drainmast; and a baffler extending downstream from said trailing edge, wherein:
   said drainmast includes a distal portion disposed within a free-stream airflow,
   said free-stream airflow disposed beyond a boundary layer of said body, and
   said baffler disposed at a negative angle of attack with respect to said free-stream airflow flowing in a direction from the nose portion to the tail portion.

23. The aircraft of claim 22, wherein:
   said barrier is disposed at a barrier angle, $\alpha 1$, with respect to a direction of said free-stream airflow, and
   said barrier angle, $\alpha 1$, is in the range of from about 10 to 15°.

24. The aircraft of claim 22, wherein:
   said leading edge is swept backwards at a swept back angle, $\alpha 2$, with respect to a direction of said free-stream airflow, and
   said swept back angle, $\alpha 2$, is in the range of from about 0 to 35°.

25. The aircraft of claim 22, wherein:
said discharge conduit is adapted for fluid flow therethrough from a proximal portion of said drainmast to said distal portion of said drainmast,
said discharge conduit terminates distally in a discharge port for discharging said fluid from said aircraft,
said barrier is disposed at said distal portion of said drainmast, and
said baffler prevents proximal migration of said fluid to locations proximal to said barrier.

26. The aircraft of claim 25, wherein:
said drainmast terminates distally in a mast foot,
said discharge port is disposed at a forward portion of said mast foot,
said discharge port having an upstream perimeter disposed adjacent to a leading edge of said mast foot, and
said discharge port further having a downstream perimeter located at a distance from said leading edge of said mast foot of not more than 60% of a mast foot length, $L_{FT}$, of said mast foot.

27. The aircraft of claim 22, wherein the body further comprises
an aircraft skin; and
a gas turbine engine housed within an aircraft skin, wherein said gas turbine engine comprises a source of fluid; and the drainmast being in fluid communication with said gas turbine engine.

28. The aircraft of claim 27, wherein said fluid is selected from the group that includes one or more of oil, fuel, and air.

29. The aircraft of claim 27, further comprising a fluid collection unit in fluid communication with said gas turbine engine for collecting said fluid, wherein said fluid collection unit is further in fluid communication with said drainmast for passing said fluid to said drainmast.

30. An apparatus for discharging a fluid from an aircraft in flight, the aircraft having a nose portion and a tail portion, the apparatus comprising:
a drainmast;
a discharge conduit disposed within said drainmast and configured to discharge fluid from the aircraft;
a barrier extending downstream from a trailing edge of said drainmast and oriented with a negative angle of attack relative to airflow flowing from the nose portion to the tail portion of the aircraft, and
at least one vane disposed within said discharge conduit.

31. The apparatus of claim 30, wherein:
said discharge conduit is adapted for fluid flow therethrough, and
said at least one vane is adapted for deflecting said fluid flow within said discharge conduit.

32. The apparatus of claim 30, wherein:
said discharge conduit terminates distally in a discharge port,
said drainmast terminates distally in a mast foot,
said discharge port is disposed in a forward portion of said mast foot, and
said at least one vane is disposed adjacent to said discharge port.

33. The apparatus of claim 30 wherein:
said drainmast includes a distal portion extending distally beyond a boundary layer of said aircraft.

34. An apparatus for discharging fluid from an aircraft in flight, the aircraft having a nose portion and a tail portion, the apparatus comprising:
a drainmast having a leading edge and a trailing edge;
a discharge conduit disposed within said drainmast; and
a baffler extending downstream from said trailing edge, wherein:
said drainmast includes a distal portion,
said drainmast having a mast length, $L_{DM}$, such that said distal portion of said drainmast extends beyond a boundary layer of said aircraft and into a free-stream airflow flowing in a direction from the nose portion to the tail portion,
said drainmast terminating at said distal portion in a mast foot,
wherein at least a portion of said mast foot is disposed at a cutback angle, $\alpha 3$, in the range of from about 20 to 15° with respect to a direction of said free-stream airflow,
said discharge conduit is adapted for fluid flow therethrough,
said discharge conduit terminating distally in a discharge port,
said discharge port adapted for discharge of said fluid from said aircraft,
said discharge port disposed at a forward portion of said mast foot, and
said baffler disposed at a negative angle of attack with respect to said free-stream airflow.

35. The apparatus of claim 34, wherein said negative angle of attack is defined by a baffler angle, $\alpha 1$, in the range of from about 3 to 12°.

36. The apparatus of claim 34, wherein:
said discharge port includes a downstream perimeter, and
said downstream perimeter is located at a distance from a leading edge of said mast foot of not more than 50% of a mast foot length, $L_{FT}$, of said mast foot.

* * * * *

UNITED STATES PATENT AND TRADEMARK OFFICE
CERTIFICATE OF CORRECTION

PATENT NO. : 7,651,055 B2  Page 1 of 1
APPLICATION NO. : 11/122354
DATED : January 26, 2010
INVENTOR(S) : Turner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Twenty-third Day of November, 2010

David J. Kappos
*Director of the United States Patent and Trademark Office*